United States Patent
Mankame et al.

(10) Patent No.: US 10,682,934 B2
(45) Date of Patent: Jun. 16, 2020

(54) SEAT SUSPENSION WITH THREE-DIMENSIONAL FEATURES FOR IMPROVED OCCUPANT COMFORT

(71) Applicant: GM Global Technology Operations LLC, Detroit, MI (US)

(72) Inventors: Nilesh D. Mankame, Ann Arbor, MI (US); Onkar Akolkar, Warren, MI (US); Daniel W. Booth, Troy, MI (US); Paul W. Alexander, Ypsilanti, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/130,221

(22) Filed: Sep. 13, 2018

(65) Prior Publication Data

US 2020/0086773 A1    Mar. 19, 2020

(51) Int. Cl.
*B60N 2/54* (2006.01)
*B60N 2/70* (2006.01)
*B60N 2/68* (2006.01)

(52) U.S. Cl.
CPC .............. *B60N 2/542* (2013.01); *B60N 2/544* (2013.01); *B60N 2/68* (2013.01); *B60N 2/7094* (2013.01)

(58) Field of Classification Search
CPC .......... B60N 2/542; B60N 2/50; B60N 2/544; B60N 2/68; B60N 2/7094
USPC ........................................ 297/452.49, 452.48
See application file for complete search history.

(56) References Cited

U.S. PATENT DOCUMENTS

| | | | | |
|---|---|---|---|---|
| 3,109,621 A * | 11/1963 | Simons | .................. | B60N 2/045 248/564 |
| 4,429,427 A * | 2/1984 | Sklar | ...................... | A47C 27/20 5/654.1 |
| 6,018,832 A * | 2/2000 | Graebe | ................ | A61G 5/1043 5/654 |
| 6,598,251 B2 * | 7/2003 | Habboub | ............... | B60N 2/242 297/452.42 |
| 2007/0257529 A1 * | 11/2007 | Matsuhashi | .............. | B60N 2/70 297/217.4 |
| 2015/0165950 A1 * | 6/2015 | Sachs | ....................... | B60N 2/62 297/452.48 |
| 2015/0283923 A1 * | 10/2015 | Kordel | ................. | B60N 2/7094 297/452.49 |
| 2016/0144756 A1 * | 5/2016 | Ito | ........................ | B60N 2/7047 297/452.49 |

OTHER PUBLICATIONS

Mankame, Nilesh D. et al.; U.S. Appl. No. 15/727,155, filed Oct. 6, 2017; 45 pages.

* cited by examiner

*Primary Examiner* — Mark R Wendell

(57) ABSTRACT

A seat assembly for supporting an occupant of a vehicle includes a cushion and a suspension. The cushion has a first surface and a second surface. The first surface is configured to engage the occupant. The second surface is disposed opposite the first surface. The suspension includes a first portion and a second portion. The first portion includes a third surface. The third surface engages the second surface of the cushion. The second portion includes a fourth surface. The fourth surface defines a first depression. The first depression opens toward the cushion. The first depression is configured to receive a portion of the cushion when the occupant exerts a load on the cushion.

19 Claims, 13 Drawing Sheets

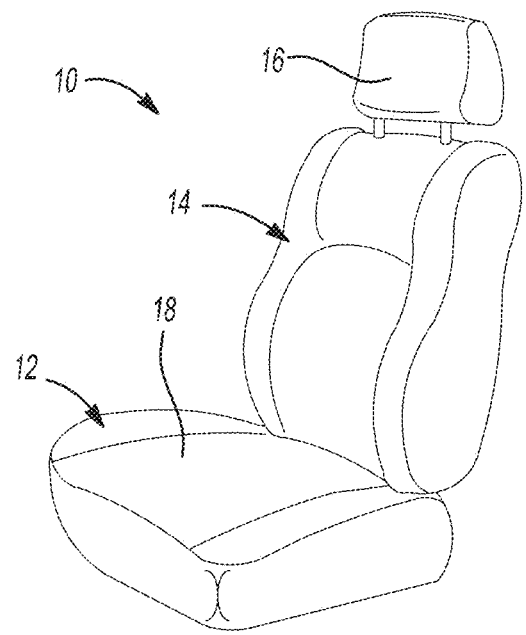
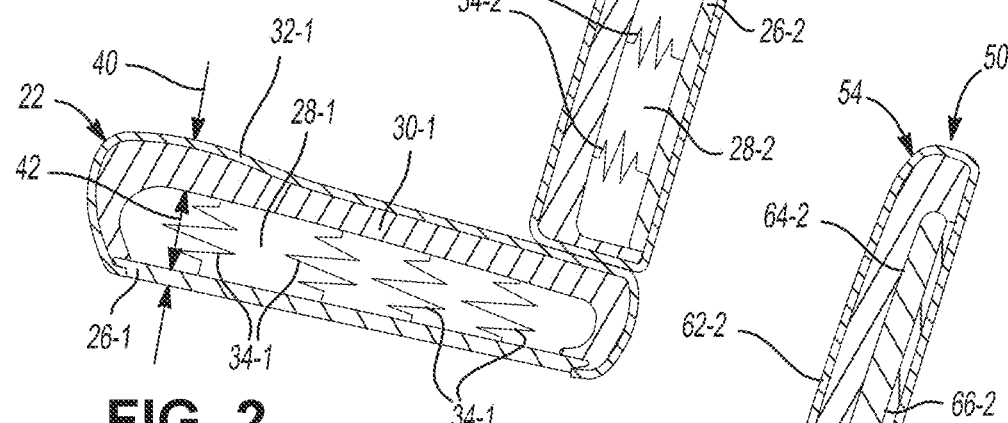
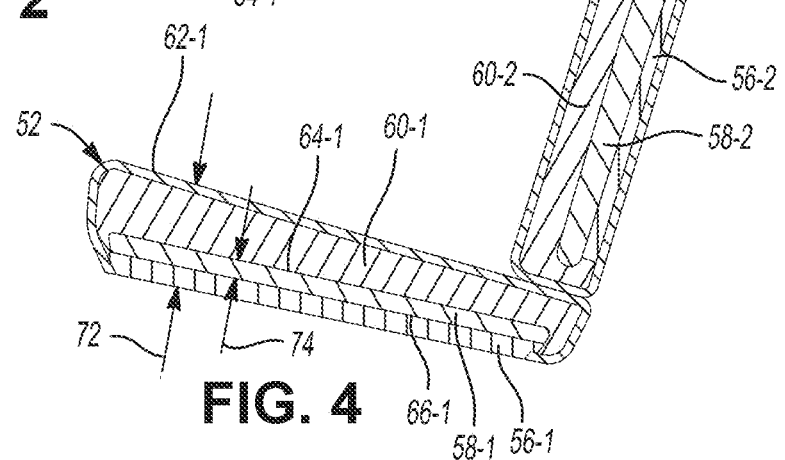

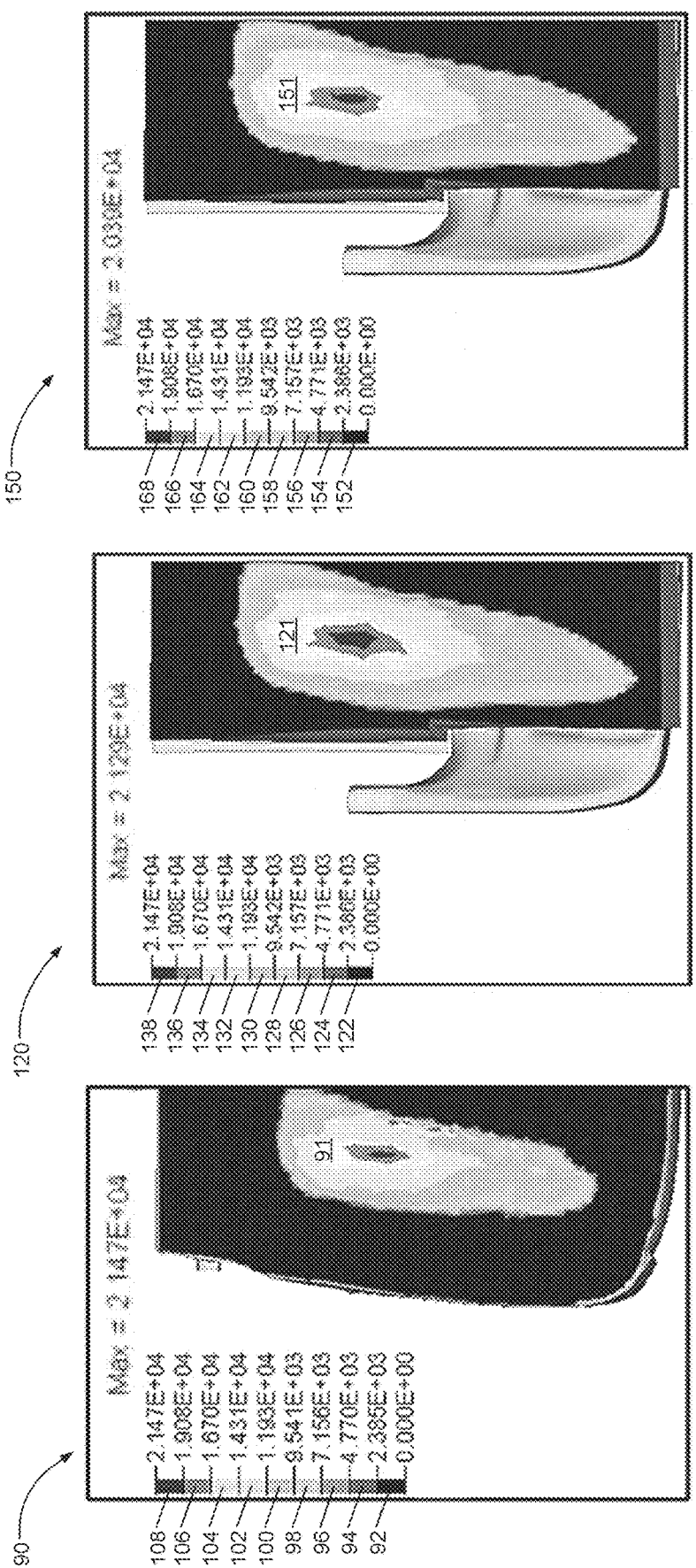

SEAT SUSPENSION WITH THREE-DIMENSIONAL FEATURES FOR IMPROVED OCCUPANT COMFORT

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to a seat suspension for a seat assembly of the vehicle. More particularly, the seat suspension has three-dimensional features for improved occupant comfort.

A seat assembly, such as a seat assembly for a vehicle, typically includes a lower portion and a back portion. Each of the lower portion and the back portion generally includes a frame, a suspension, a cushion, and a trim material. The frame provides a support structure to couple the lower portion and the back portion to one another and to the vehicle. The suspension is disposed between the cushion and the frame. The cushion is typically made of an expanded foam material and molded in a predetermined shape. The trim material is used as a cover to at least partially enclose the frame, the suspension, and the foam, and to provide the seat assembly with a desired appearance.

SUMMARY

In various aspects, the present disclosure provides a seat assembly for supporting an occupant of a vehicle. The seat assembly includes a cushion and a suspension. The cushion has a first surface and a second surface. The first surface is configured to engage the occupant. The second surface is disposed opposite the first surface. The suspension includes a first portion and a second portion. The first portion includes a third surface. The third surface engages the second surface of the cushion. The second portion includes a fourth surface. The fourth surface defines a first depression. The first depression opens toward the cushion. The first depression is configured to receive a portion of the cushion when the occupant exerts a load on the cushion.

In one aspect, the first portion includes a textile material.

In one aspect, the textile material includes at least one of a knitted structure, a woven structure, a crocheted structure, or a braided structure.

In one aspect, the first portion includes a first knitted structure. The second portion includes a second knitted structure. The second knitted structure is different than the first knitted structure.

In one aspect, the second portion includes a textile material.

In one aspect, the textile material includes at least one of a knitted structure, a woven structure, a crocheted structure, or a braided structure.

In one aspect, the textile material includes the knitted structure. The knitted structure is a three-dimensional (3D) knitted structure.

In one aspect, the second portion includes the knitted structure. The knitted structure includes a plurality of ribs.

In one aspect, the second portion includes an elastomer.

In one aspect, the first portion includes the elastomer.

In one aspect, the suspension further includes a third portion. The third portion includes a fifth surface. The fifth surfaces defines a second depression. The second depression is open toward the cushion. The second depression is configured to receive a portion of the cushion when the occupant exerts the load on the cushion.

In one aspect, the first portion is configured to provide a first response to the load. The second portion is configured to provide a second response to the load. The second response is different than the first response.

In one aspect, the first response includes at least one of a stiffness response, an energy dissipation response, and a thermal response. The second response includes at least one of a stiffness response, an energy dissipation response, and a thermal response.

In one aspect, the first depression includes a plurality of depressions.

In one aspect, the plurality of depressions includes a primary depression and a secondary depression. The secondary depression is further recessed with respect to the cushion than the primary depression.

In various aspects, the present disclosure provides a seat assembly for supporting an occupant of a vehicle. The seat assembly includes a cushion and a suspension. The cushion has a first surface and a second surface. The first surface is configured to engage the occupant. The second surface is disposed opposite the first surface. The suspension includes a first portion and a second portion. The first portion includes a third surface. The third surface engages the second surface of the cushion. The second portion includes a fourth surface. At least a portion of the fourth surface is spaced apart from the second surface of the cushion to define a gap.

In one aspect, the first portion includes a first textile. The first textile has at least one of a first knitted structure, a first woven structure, a first crocheted structure, a first braided structure. The second portion includes a second textile. The second textile has at least one of a second knitted structure, a second woven structure, a second crocheted structure, and a second braided structure.

In one aspect, the second textile includes the second knitted structure. The second knitted structure is a three-dimensional (3D) knitted structure.

In one aspect, the first portion is configured to provide a first response to the occupant exerting a load on the cushion. The second portion is configured to provide a second response to the load. The second response is different than the first response.

In various aspects, the present disclosure provides a seat assembly for supporting an occupant of a vehicle. The seat assembly includes a cushion and a suspension. The cushion has a first surface and a second surface. The first surface is configured to engage the occupant. The second surface is disposed opposite the first surface. The suspension includes a first knitted portion and a second knitted portion. The first knitted portion includes a third surface. The third surface engages the second surface of the cushion. The second knitted portion has a three-dimensional (3D) knitted structure. The second knitted portion includes a fourth surface. The fourth surface defines a depression. The depression is open toward the cushion. The depression is configured to receive a portion of the cushion when the occupant exerts a load on the cushion. The first knitted portion is configured to provide a first response to the occupant exerting a load on the cushion. The second knitted portion is configured to provide a second response to the load. The second response is different than the first response.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 1 is a perspective view of a seat assembly according to certain aspects of the present disclosure;

FIG. 2 is sectional view of a seat assembly, the seat assembly including a lower portion and a back portion that each include a frame, a metal spring suspension, a cushion, and a trim cover;

FIG. 4 is a sectional view of a seat assembly according to certain aspects of the present disclosure, the seat assembly including a lower portion and a back portion that each include a frame, a full suspension, a cushion, and a trim cover;

FIGS. 6-8 are pressure distribution maps of portions of vehicle seats according to certain aspects of the present disclosure, the vehicle seats being under occupant load; FIG. 6 depicts a vehicle seat having a metal spring suspension; FIG. 7 depicts a vehicle seat having a full suspension; and FIG. 8 depicts a vehicle seat having a full suspension defining an aperture;

FIG. 9A depicts the vehicle seat that is not under external load; and FIG. 9B depicts the vehicle seat under occupant load;

FIG. 10A depicts the cushion and suspension absent an external load; FIG. 10B depicts the cushion and suspension under occupant load;

DETAILED DESCRIPTION

Figure 3:
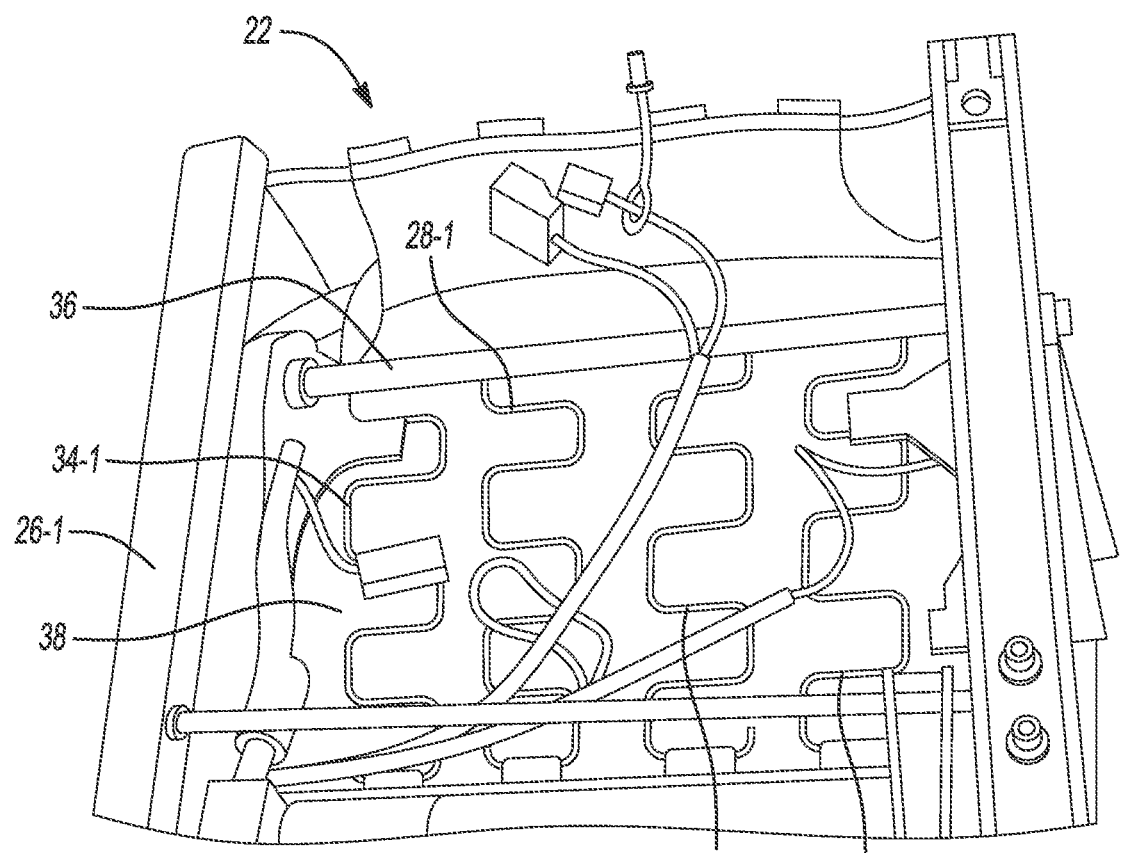
FIG. 3 is a photograph of an underside of the lower portion of the seat assembly of FIG. 2.

As discussed above, seat assemblies generally include frames, suspensions, cushions (e.g., expandable foam), and trim material. A comfort level of a seated occupant is affected by an area and pattern of the occupant's contact with surfaces of the lower portion and the back portion of the seat assembly, and by a maximum contact pressure and pressure distribution of the contact pressure experienced by the occupant. Pressure distribution and contact pressure experienced by the occupant are dependent upon the configuration of the trim material, the cushion, and the suspension. The level of comfort of the seated occupant can be further affected by thermal characteristics of the seat, including thermal conductivity, heat storage capacity, and resistance to flow of fluid through the seat.

The suspension is disposed between the cushion and the frame. Vehicle inputs, such as vibration, noise, and road feel, are transmitted from a vehicle structure to an occupant contact surface through the suspension. The occupant generates a load at the contact surface, which is transmitted through the trim cover, the cushion, and the suspension. The combination of the trim cover, the cushion, and the suspension generate a response to the occupant load, which includes the contact pressure exerted on the seated occupant. The contact pressure is distributed over a contact area of the occupant with the contact surface of the seat assembly. Increasing the contact area can therefore decrease the contact pressure.

Many suspensions, referred to as metal spring suspensions, include a plurality of springs extending across a bracket. Metal spring suspensions include large open regions between each spring. A contact area between the springs of the suspension and a cushion of the seat assembly is relatively small, which can lead to decreased occupant comfort.

Full suspensions can be constructed from textiles or homogeneous materials, such as elastomers. Full suspensions extend across all or a substantial portion of a cushion to increase contact between the suspension and the cushion and improve occupant comfort. Full suspensions can also include features that facilitate greater conformance to the occupant's body, such as apertures, changes in thickness, and/or changes in material, by way of example. Although apertures in a full suspension can decrease maximum contact pressure and improve occupant comfort, apertures may also result in increased wear of the cushion. More particularly, when the seat assembly is under occupant load, the cushion can extrude through the aperture and experience chafing and accelerated wear.

In various aspects, the present disclosure provides a seat assembly including a full suspension having at least one depression. The depression can improve the conformance of the seat to an occupant, thereby distributing the occupant load over a larger area to decrease a maximum contact pressure. As such, the suspension with the depression can improve occupant comfort. A surface of the depression provides a boundary to limit extrusion of the cushion into the depression and decrease a rate of wear of the seat assembly. Accordingly, the full suspension having the aperture maximizes occupant comfort while minimizing wear.

Referring to FIG. 1, a seat assembly 10 according to certain aspects of the present disclosure is provided. The seat assembly 10 includes a lower portion 12, a back portion 14, and a headrest 16. The seat assembly 10 may be a vehicle seat for seating an occupant within a cabin of a vehicle. The seat assembly 10 is an individual seat, also referred to as a "bucket seat." However, in alternative aspects, a vehicle according to certain aspects of the present disclosure is a bench seat that is capable of seating multiple occupants (not shown). The seat assembly 10 is operatively attached to a base that is attached to a structural element of the vehicle, such as a floor (not shown). The seat assembly 10 includes a trim cover 18 that is in contact with an occupant. The trim cover 18 can include cloth, leather, a polymer material, or combinations thereof.

With reference to FIGS. 2-3, another example seat assembly 20 is provided. The seat assembly 20 includes a lower portion 22 and a back portion 24. The lower portion 22 includes a first frame 26-1, a first metal spring suspension 28-1, a first cushion 30-1, and a first trim cover 32-1. The back portion 24 includes a second frame 26-2, a second metal spring suspension 28-2, a second cushion 30-2, and a second trim cover 32-2.

The first metal spring suspension 28-1 includes a first plurality of spring elements 34-1. The second metal spring suspension 28-2 includes a second plurality of spring elements 34-2. The spring elements 34-1, 34-2 can be coil springs, serpentine springs, zig-zag springs, wire springs, compression springs, conical springs, magazine springs, barrel springs, or combinations thereof.

The spring elements 34-1, 34-2 are attached to a suspension bracket 36 (FIG. 3). Mats 38 (FIG. 3) are disposed between the cushions 30-1, 30-2 and the respective metal spring suspensions 28-1, 28-2. The spring elements 34-1, 34-2 only directly contact a small portion of the respective mats 38.

At any location on the seat assembly 20, an overall thickness 40 of the lower and back portions 22, 24 is dependent upon a frame thickness (not shown), a suspension thickness 42, a mat thickness (not shown), a cushion thickness (not shown), and a trim cover thickness (not shown). The thicknesses 40, 42 may vary based on location on the seat assembly 20. The thicknesses 40, 42 may be the same or different on the lower portion 22 and the back portion 24.

Figure 5:
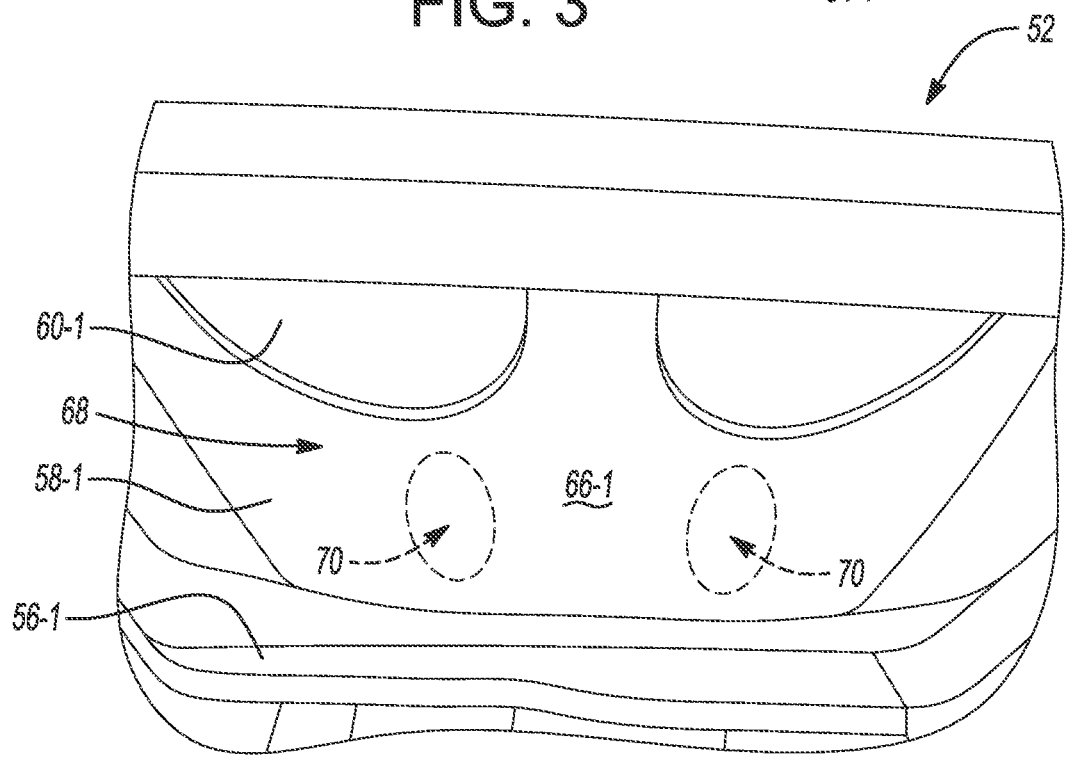
FIG. 5 is a photograph of an underside of the lower portion seat assembly of FIG. 4.

With reference to FIGS. 4-5, a seat assembly 50 according to certain aspects of the present disclosure is provided. The seat assembly 50 includes a lower portion 52 and a back portion 54. The lower portion 52 includes a first frame 56-1, a first suspension 58-1, a first cushion 60-1, and a first trim cover 62-1. The back portion 54 includes a second frame 56-2, a second suspension 58-2, a second cushion 60-2, and a second trim cover 62-2. The first and second suspensions 58-1, 58-2 are full suspensions and may be referred to as first and second full suspensions, respectively.

As used herein, "full suspension" refers to a suspension that extends across a substantial portion of an adjacent cushion. A full suspension is formed from a textile or a homogeneous material. In various aspects, a full suspension has spatially varying mechanical properties, as described below.

The suspensions 58-1, 58-2 are shaped to cover significant portions of surface areas of B-sides of the respective cushions 60-1, 60-2. In one example, the suspensions 58-1, 58-2 are coextensive with the respective cushions 60-1, 60-2. Accordingly, in various aspects, the suspensions 58-1, 58-2 are referred to as "full B-support seat suspensions." The first suspension 58-1 includes a first A-surface 64-1 and a first B-surface 66-1. The second suspension 58-2 includes a second A-surface 64-2 and a second B-surface 66-2. The A-surfaces 64-1, 64-2 are in direct contact with the respective cushions 60-1, 60-2.

The suspensions 58-1, 58-2 have spatially varying mechanical properties that can be configured for distribution of a load of a seated occupant over a relatively larger contact area than that of the metal spring suspensions 28-1, 28-2 of FIGS. 2-3. Accordingly, a maximum contact pressure is decreased and the contact pressure is distributed in a preferred pattern. Examples of the suspensions 58-1, 58-2 are described in U.S. patent application Ser. No. 15/727,155 (Title: Multi-zone Seat Suspension; Inventors: Nilesh D. Mankame and Onkar S. Akolkar; Filing Date: Oct. 6, 2017), incorporated herein by reference in its entirety.

Each suspension 58-1, 58-2 includes a first zone or portion 68 and a second zone or portion 70 (FIG. 5). The first and second portions 68, 70 have different mechanical and/or material properties, including differences in elastic modulus, damping, thermal conductivity, density, resistance to fluid flow, and combinations thereof. Accordingly, the first and second portions 68, 70 provide different responses when the occupant exerts a load on the seat assembly 50.

The first portion 68 is configured to provide a first response to occupant load and the second portion 70 is configured to provide a second response to occupant load. In one example, the first response is one of a stiffness response, an energy dissipation response, and a thermal response and the second response is one of a stiffness response, an energy dissipation response, and a thermal response. The differences in mechanical and/or material properties can be achieved by varying the method of forming, type of material, structure of material, shape, size, thickness, density, geometric configuration, presence of openings, or combinations thereof between the first portion 68 and the second portion 70.

The suspensions 58-1, 58-2 are made from a homogeneous material, a textile material, or combinations thereof. Homogeneous materials can be non-metallic materials, such as polymeric materials. Polymeric materials can include polyurethane, polymeric foams, elastomers, or combinations thereof. Elastomers can include silicone, thermoplastic elastomer (TPE), or combinations thereof. Homogeneous materials may be formed by molding or pressing, by way of example.

Textile materials may be formed by weaving to generate a woven structure, knitting to generate a knitted structure, crocheting to generate a crocheted structure, braiding to generate a braided structure, or combinations thereof. The textile material may be made using a combination of these methods to incorporate multiple structures. In one example, a knitted portion is formed using braided fibers. In another example, fibers are woven through a knitted or crocheted structure to provide dimensional strength and/or stabilization. In yet another example, a crocheted edge is formed on a knitted or woven structure. In yet another example, woven layers are knitted together to form a multi-layer textile material.

Textile structure can be varied by stitch type, stitch pattern, needle size, yarn type, yarn denier, fiber type, fiber size, stitch density, warp pattern, weft pattern, weave type, or combinations thereof. These features of the textile material affect characteristics of the textile material, such as density, thickness, porosity, thermal conductivity, elasticity, and dynamic response.

Multi-layer materials (also referred to as "multi-dimensional materials") include 3D materials, multi-layer mesh materials, multi-layer woven materials, and the like. The textile material can be formed using a combination of techniques. For example, the textile material can be a knitted 3D material into which weft and/or warp threads have been woven to provide for directional properties such as directional stretch ability, predetermined distortion of spaces in the textile structure under load, damping characteristics, etc., where the examples shown are not intended to be limiting. The textile material can include multiple layers formed by the same technique, such as a double-layer weave material, or where at least one of the multiple layers is formed by a different technique than another of the multiple layers. For example, the textile material can include a first layer which is a woven layer and a second layer which is a knitted layer.

The fiber is formed, by way of non-limiting example, by spinning, extrusion, drawing, and the like. The textile material can be formed of a yarn including a plurality of fibers which have been spun or twisted together or otherwise interlocked or joined to form a yarn. The textile material can include monofilament fiber, polyfilament fiber, staple fiber, or a combination of these.

Textile materials can include one or more types of fiber. Example fibers include organic fibers, synthetic fibers, carbon-based fibers, ceramic-based fibers, metal-based fibers, and blended fibers. Organic fibers include animal fibers and plant-based fibers. Examples of animal fibers include wool fiber produced from the hair and/or fur of any animal providing hair/fur suitable for fiber production (e.g., sheep, goats, rabbits, llamas), silk fiber produced from insect cocoons, and the like. Examples of plant-based fibers include fiber produced from any plant providing a plant material which is suitable for fiber production (e.g., cotton, flax, wood (acetate, rayon), bamboo, jute, hemp, raffia, sisal, and soy). Examples of synthetic fibers include polymer fibers, such as acrylic fibers, nylon fibers, polyester fibers, co-polymer fibers (e.g., Spandex), aramid fibers (e.g., KEVLAR™, NOMEX™), and the like. An example of a ceramic-based fiber is a glass-based fiber. Examples of metal-based fibers include steel-based fibers or wires, aluminum-based fibers or wires, or combinations thereof. Examples of blended fibers include animal/synthetic blended fibers, animal/plant blended fibers, plant/synthetic blended fibers, glass/polymer blended fibers (i.e., fiberglass), and metal/synthetic blended fibers.

Returning to FIG. 4, the lower and back portions 52, 54 define an overall thickness 72. A suspension thickness 74 is less than the suspension thickness 42 of the metal spring suspensions 28-1, 28-2 of FIGS. 2-3. Thus, the overall thickness 72 is also ess than the overall thickness 40 of the metal spring suspensions 28-1, 28-2 of FIGS. 2-3. The decrease in thickness as compared to the metal spring suspensions 28-1, 28-2 can enable a decrease in vehicle size and/or an increase in space within a passenger cabin of the vehicle. The decrease in vehicle size can include a decrease in height, length, and/or weight, potentially resulting in improved vehicle dynamics and/or fuel efficiency. The increase in space within the passenger cabin can allow for an increase in range of seat position adjustment, increased passenger space, and/or increased cargo space to improve occupant comfort.

Referring to FIGS. 6-8, example contour plots for halves of various symmetric vehicle seats are provided. The vehicle seats include a metal spring suspension (FIG. 6), a full suspension (FIG. 7), and a full suspension defining an aperture (FIG. 8). The contour plots depict pressure in various zones of the respective seats when an occupant exerts a load (i.e., sits) on the seats.

FIG. 6 depicts a contour plot 90 for half of a lower portion of a symmetric seat assembly having a metal spring suspension. The contour plot 90 defines an occupant contact area 91. The contour plot 90 includes a first region 92 corresponding to a pressure of 0-2.385 kPa, a second region 94 corresponding to a pressure of 2.385-4.770 kPa, a third region 96 corresponding to a pressure of 4.770-7.156 kPa, a fourth region 98 corresponding to a pressure of 7.156-9.541 kPa, a fifth region 100 corresponding to a pressure of 9.541-11.93 kPa, a sixth region 102 corresponding to a pressure of 11.93-14.31 kPa, a seventh region 104 corresponding to a pressure of 14.31-16.70 kPa, an eighth region 106 corresponding to a pressure of 16.70-19.08 kPa, and a ninth region 108 corresponding to a pressure of 19.08-21.47 kPa. A maximum contact pressure is 21.47 kPa.

FIG. 7 depicts a contour plot 120 for half of a lower portion of a symmetric seat assembly having a full suspension. The contour plot 120 includes an occupant contact area 121. The contour plot 120 includes a first region 122 corresponding to a pressure of 0-2.386 kPa, a second region 124 corresponding to a pressure of 2.386-4.771 kPa, a third region 126 corresponding to a pressure of 4.771-7.157 kPa, a fourth region 128 corresponding to a pressure of 7.157-9.542 kPa, a fifth region 130 corresponding to a pressure of 9.542-11.93 kPa, a sixth region 132 corresponding to a pressure of 11.93-14.31 kPa, a seventh region 134 corresponding to a pressure of 14.31-16.70 kPa, an eighth region 136 corresponding to a pressure of 16.70-19.08 kPa, and a ninth region 138 corresponding to a pressure of 19.08-21.47 kPa. A maximum contact pressure is 21.29 kPa.

FIG. 8 depicts a contour plot 150 for half of a lower portion of a symmetric seat assembly having a full suspension defining an aperture. The contour plot 150 includes an occupant contact area 151. The contour plot 150 includes a first region 152 corresponding to a pressure of 0-2.386 kPa, a second region 154 corresponding to a pressure of 2.386-4.771 kPa, a third region 156 corresponding to a pressure of 4.771-7.157 kPa, a fourth region 158 corresponding to a pressure of 7.157-9.542 kPa, a fifth region 160 corresponding to a pressure of 9.542-11.93 kPa, a sixth region 162 corresponding to a pressure of 11.93-14.31 kPa, a seventh region 164 corresponding to a pressure of 14.31-16.70 kPa, an eighth region 166 corresponding to a pressure of 16.70-19.08 kPa, and a ninth region 168 corresponding to a pressure of 19.08-21.47 kPa. A maximum contact pressure is 20.39 kPa.

The seat having the metal spring suspension (FIG. 6) yields a smaller occupant contact area 91 than the contact areas 121, 151 of the seats having full suspensions (FIGS. 7-8). The larger contact areas 121, 151 of the full suspensions lead to improved maximum contact pressures. The full suspension defining the aperture (FIG. 8) has an improved maximum contact pressure compared to the full suspension without the aperture (FIG. 7). A suspension according to certain aspects of the present disclosure may be configured to have a maximum contact pressure of less than or equal to 21 kPa, optionally less than or equal to 20 kPa, optionally less than or equal to 19 kPa, optionally less than or equal to 18 kPa, optionally less than or equal to 17 kPa, optionally less than or equal to 16 kPa, and optionally less than or equal to 15 kPa.

Figure 9B:
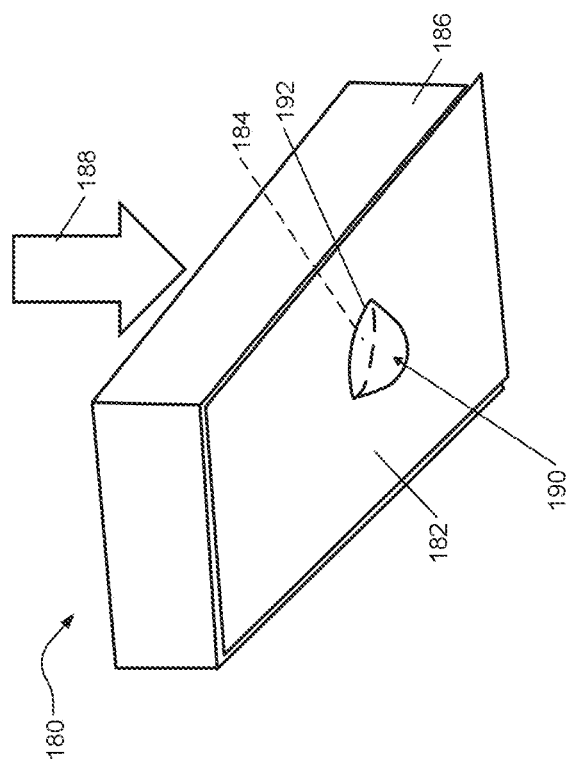
FIGS. 9A-9B are partial perspective views of a vehicle seat having a full suspension defining an aperture according to certain aspects of the present disclosure.
Figure 9A:
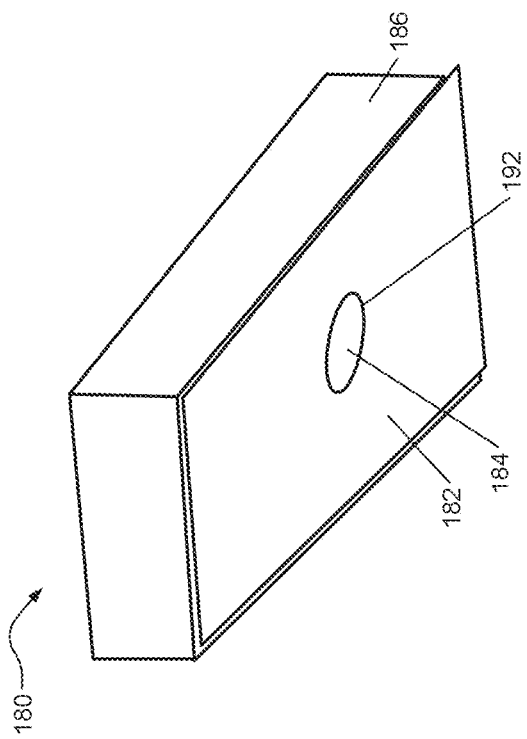

As described above, full suspensions defining an aperture (see, e.g., FIG. 8) yield a desirably high occupant contact area and a desirably low maximum contact pressure. However, seat assemblies including full suspensions with one or more apertures experience increased wear. With reference to FIGS. 9A-9B, half of a lower portion 180 of a seat according to certain aspects of the present disclosure is provided. The lower portion 180 includes a full suspension 182 defining an aperture 184. A cushion 186 is disposed on top of the full suspension 182 and immediately adjacent to the full suspension 182.

FIG. 9A depicts the lower portion 180 absent an external load 188 (e.g., a passenger). FIG. 9B depicts the load exerted on the lower portion 180. A portion 190 of the cushion 186 extrudes through the aperture 184. In various aspects, the extrusion of the cushion 186 through the aperture 184, such as under the external load 188, is referred to as "gross extrusion." The gross extrusion can cause chafing of the cushion 186, particularly at a perimeter 192 of the portion 190. The chafing can lead to excessive wear and a decreased life of the cushion 186.

Figure 10A:
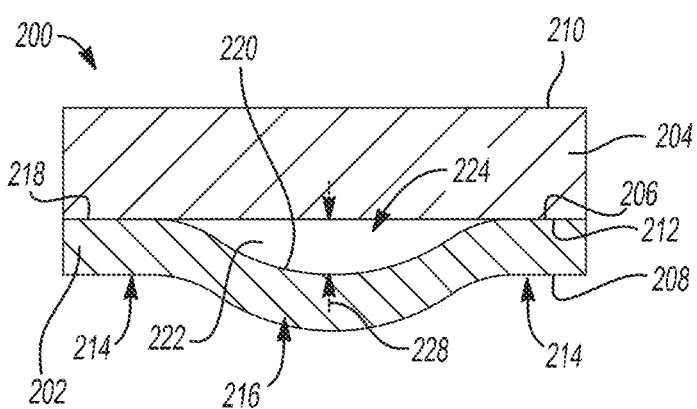
FIGS. 10A-10B are partial sectional views of a cushion and a full suspension defining a depression.
Figure 10B:
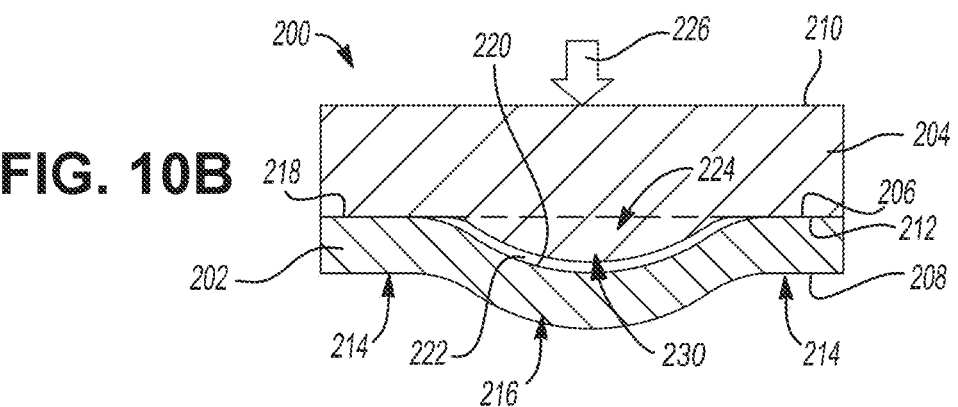

In various aspects, the present disclosure provides a suspension that facilitates a desirable increase in contact area and decrease in maximum contact pressure, while minimizing wear of a cushion. Referring to FIGS. 10A-10B, a portion of a seat assembly 200 according to certain aspects of the present disclosure is provided. The seat assembly 200 includes a full suspension 202 and a cushion 204. The full suspension 202 includes an A-side 206 and a B-side 208. The cushion 204 engages at least a portion of the A-side 206 of the full suspension 202. For example, the cushion 204 is in direct contact with the A-side 206 of the full suspension 202.

The cushion 204 includes a first surface 210 and a second surface 212 disposed opposite the first surface 210. The first surface 210 is configured to engage an occupant (e.g., through a trim cover). The second surface 212 of the cushion 204 faces the full suspension 202. The full suspension 202 includes a first portion 214 and a second portion 216.

The first portion 214 includes a third surface 218 and the second portion 216 includes a fourth surface 220. The third surface 218 of the first portion 214 engages the second surface 212 of the cushion 204. The fourth surface 220 defines a depression 222. The depression 222 includes an opening 224 that is open toward the second surface 212 of the cushion 204.

FIG. 10A depicts the seat assembly 200 absent a load and FIG. 10B depicts the seat assembly 200 under a load 226 exerted by the occupant. Absent the load, the second portion 216 of the full suspension 202 is spaced apart from the cushion 204 to define a gap 228 (FIG. 10A). Under the load 226, a portion 230 of the cushion 204 extends at least partially into the depression 222.

Depending on the magnitude and location of the load 226, the cushion 204 may extend fully into the depression 222 such that the second surface 212 of the cushion 204 engages the fourth surface 220 of the second portion 216, thereby preventing gross extrusion of the cushion 204. The second surface 212 may directly contact the fourth surface 220 under the load 226. A junction between the first portion 214 and the second portion 216 is continuous, resulting in decreased wear to the cushion 204 when it extends into the depression under the load 226.

Depressions of suspensions according to certain aspects of the present disclosure may include various shapes, sizes, and quantities. A depression can define any shape that is open toward the cushion to receive a portion of the cushion.

A portion (e.g., a second portion) may include a single depression or multiple depressions. Multiple depressions may be identical or different. For example, a suspension can include a primary depression and a secondary depression, where the secondary depression is further recessed compared to the primary depression. FIGS. 11-16 depict examples of suspension portions including various depressions.

Figure 11:
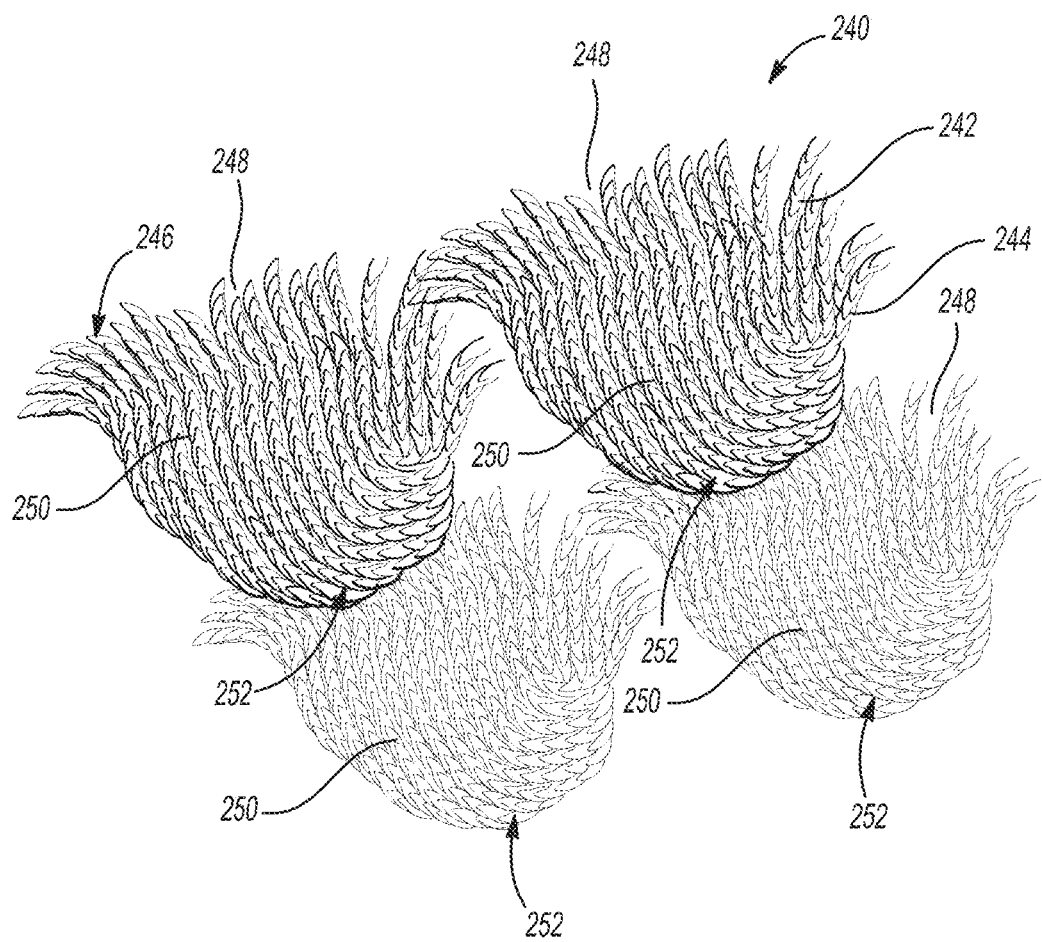
FIG. 11 is a partial perspective view of a portion of a knitted suspension according to certain aspects of the present disclosure.

Referring to FIG. 11, a portion 240 (e.g., a second portion) of a full suspension (not shown) according to certain aspects of the present disclosure is provided. The portion 240 includes a knitted structure 242. The knitted structure 242 is formed from yarn 244. The knitted structure 242 includes a surface or side 246 defining a plurality of depressions 248. The depressions 248 are open toward a cushion (not shown). The knitted structure 242 includes a plurality of protrusions 250 corresponding to the plurality of depressions 248.

The knitted structure 242 including the depressions 248 and protrusions 250 are made, for example, by adding stitches as a depth of the depression 248 increases. Accordingly, a deepest portion of the depression and corresponding apex 252 of the protrusion 250 includes a maximum quantity of stitches per row. In various aspects, the knitted structure 242 can be formed by 3D knitting.

Figure 12:
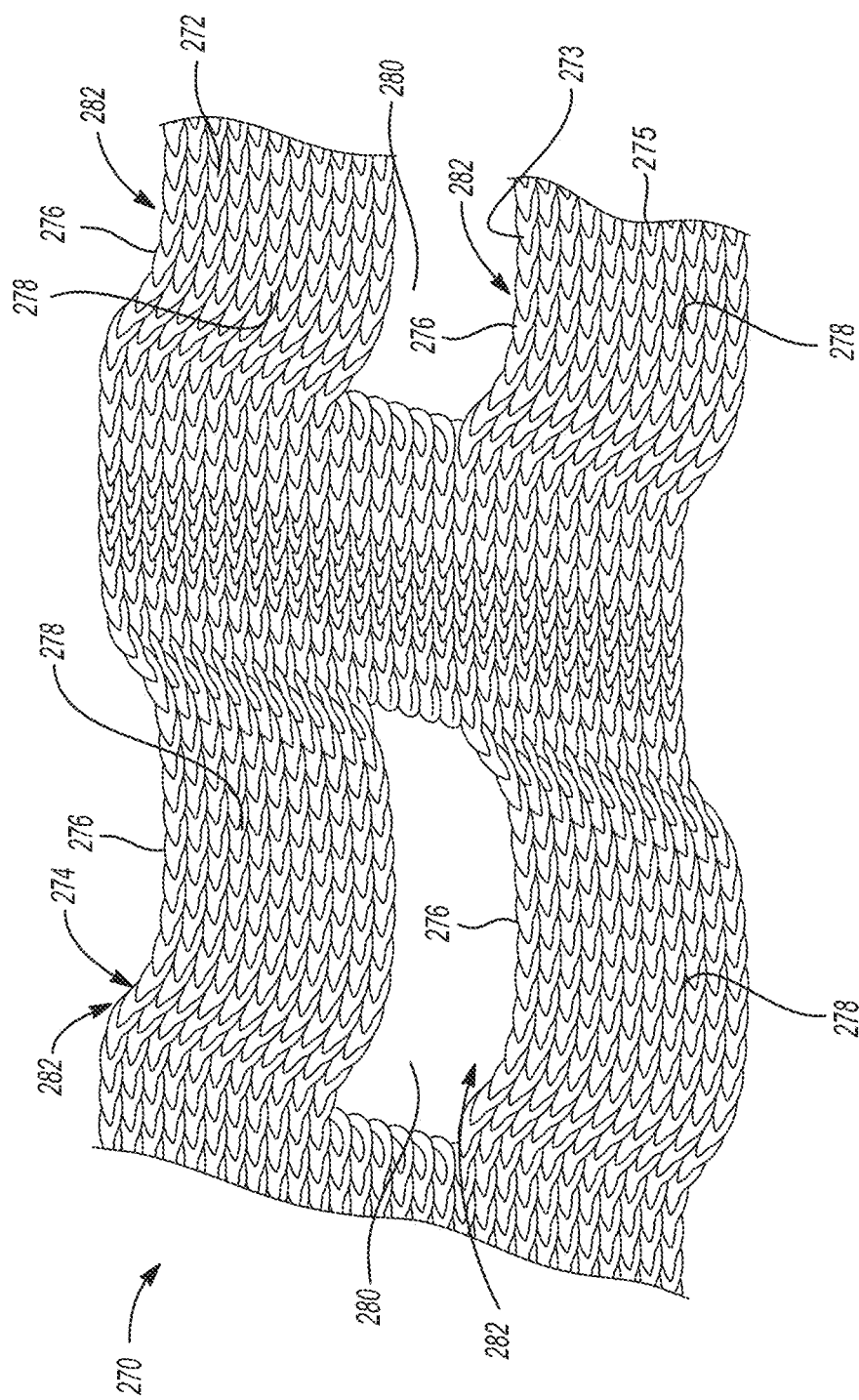
FIG. 12 is a partial perspective view of a portion of another knitted suspension according to certain aspects of the present disclosure.

Referring to FIG. 12, a portion 270 (e.g., a second portion) of another full suspension according to certain aspects of the present disclosure is provided. The portion 270 includes a knitted structure 272. The knitted structure 272 is constructed from yarn 275. The knitted structure 272 includes a surface or side 274 defining a plurality of depressions 276, a plurality of protrusions 278 corresponding to the plurality of depressions 276, and a plurality of openings 280. In various aspects, the protrusions 278 have open sides 282 and resemble hammocks. The depressions 276 are open toward a cushion (not shown).

Figure 13:
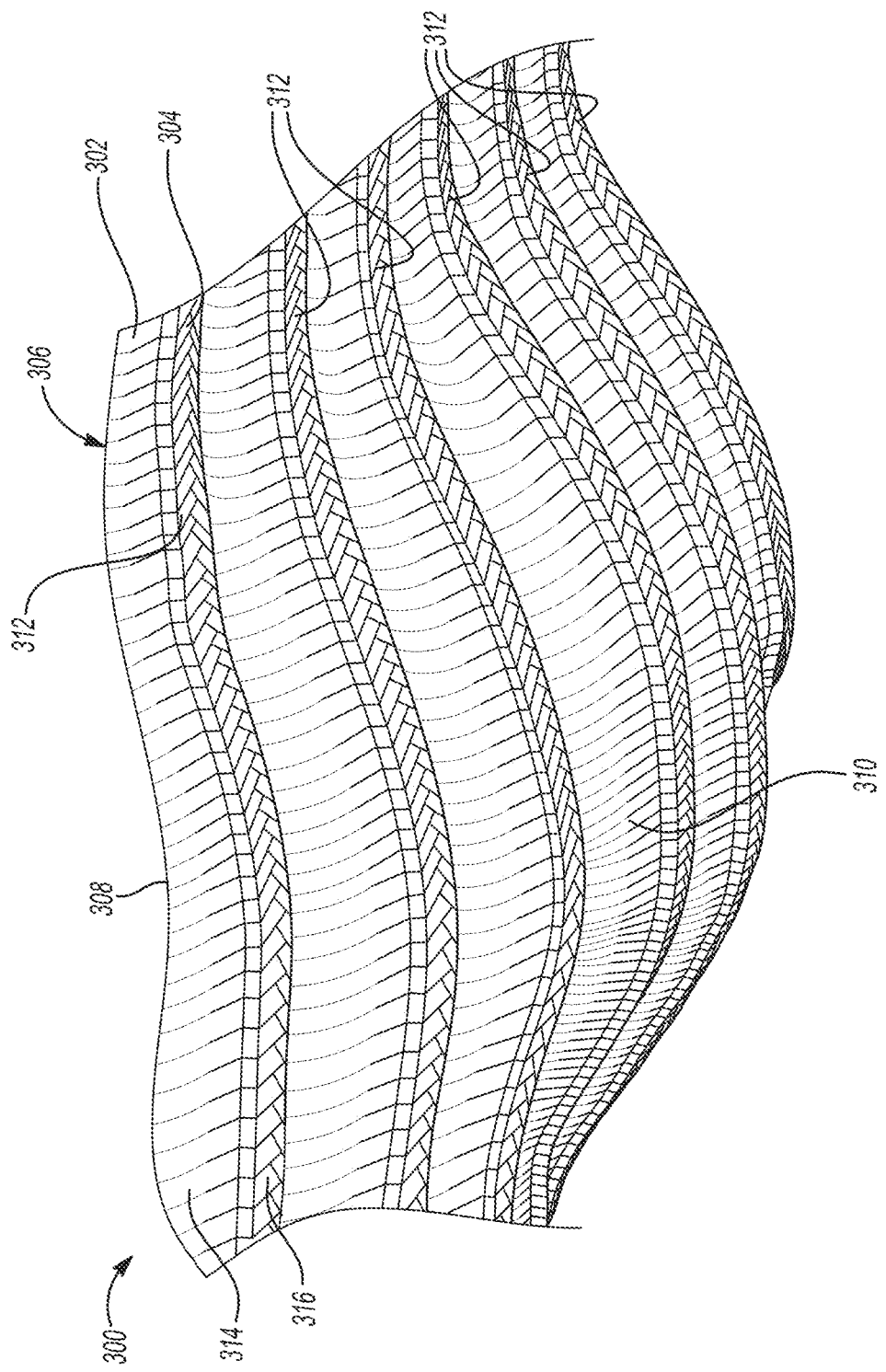
FIG. 13 is a partial perspective view of a portion of yet another knitted suspension according to certain aspects of the present disclosure.

Referring to FIG. 13, a portion 300 (e.g., a second portion) of yet another full suspension according to certain aspects of the present disclosure is provided. The portion 300 includes a knitted structure 302. The knitted structure 302 is constructed from yarn 304. The knitted structure 302 includes a surface or side 306 defining at least one depression 308 and a corresponding protrusion 310. The depression 308 is open toward a cushion (not shown).

The portion 300 includes a plurality of ribs 312. The knitted structure 302 includes a first knit 314 and a second knit 316. The ribs 312 include the second knit 316. In one example, the first knit 314 includes a knit stitch and the second knit 316 includes a purl stitch. The ribs 312 provide additional structural support for the cushion when it extends into the depression 308.

Figure 14:
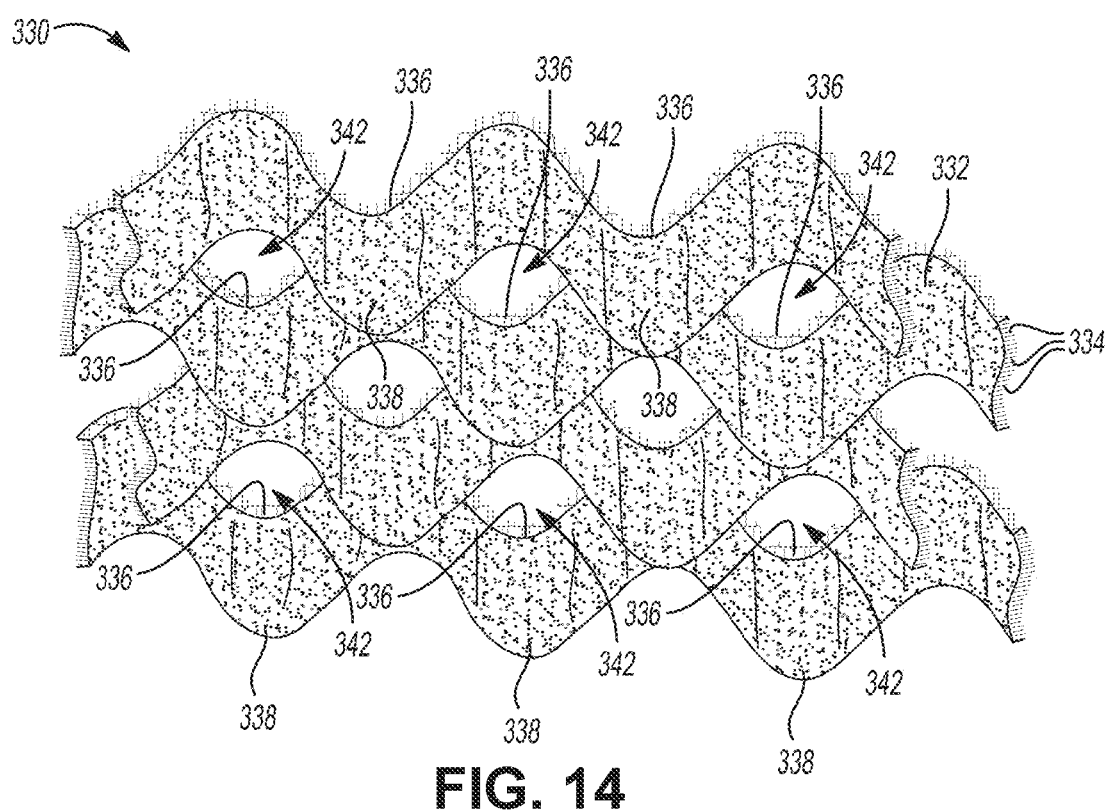
FIG. 14 is a partial perspective view of a portion of a woven suspension according to certain aspects of the present disclosure.

With reference to FIG. 14, a portion 330 (e.g., a second portion) of yet another suspension according to certain aspects of the present disclosure is provided. The portion 330 includes a woven structure 332 constructed from a plurality of fibers 334. The woven structure 332 includes a plurality of depressions 336 and a plurality of protrusions 338 corresponding to the plurality of depressions 336. The depressions 336 are open toward a cushion (not shown). The protrusions 338 include open sides 342 and resemble hammocks.

Figure 15:
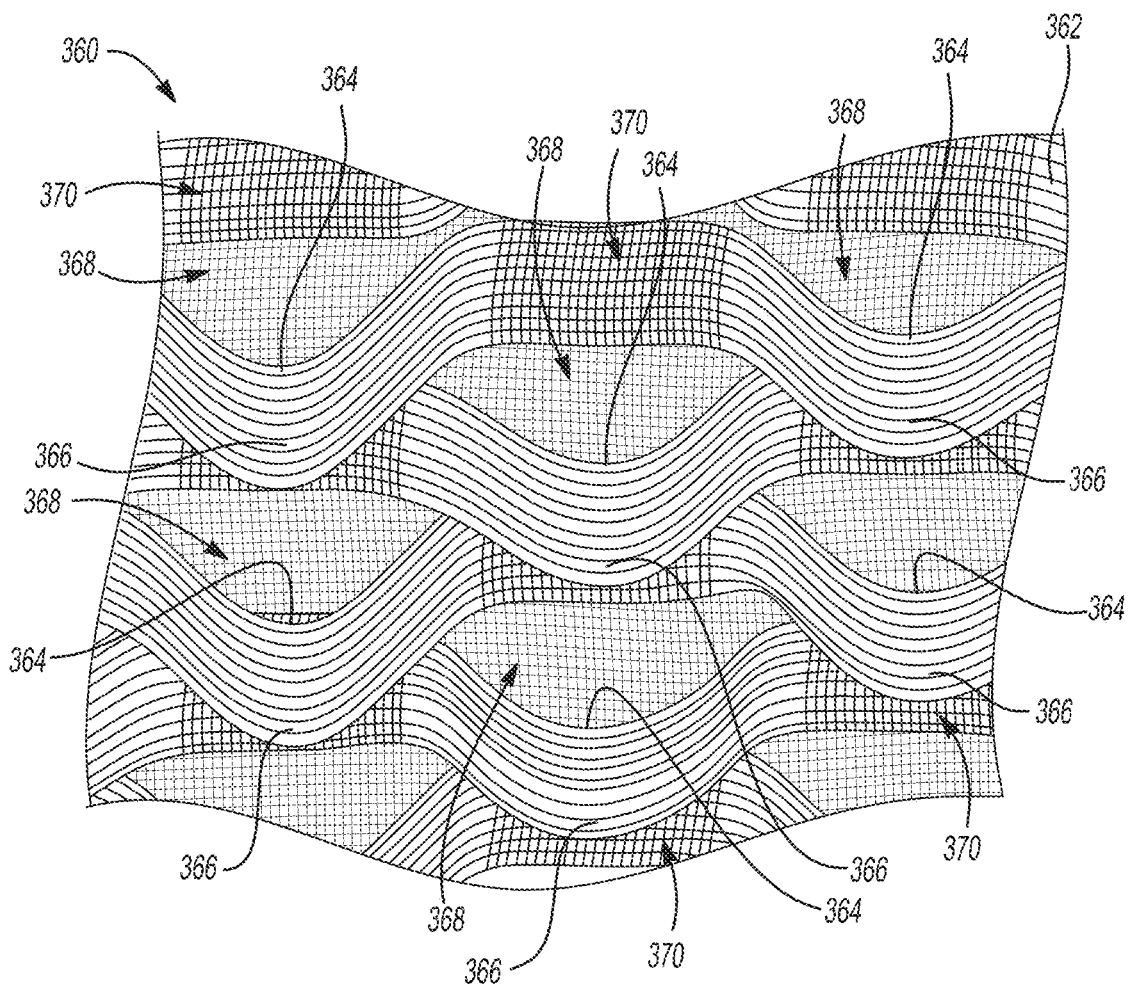
FIG. 15 is a partial perspective view of a portion of another woven suspension according to certain aspects of the present disclosure.

Referring to FIG. 15, a portion 360 (e.g., a second portion) of yet another full suspension according to certain aspects of the present disclosure is provided. The portion 360 includes a woven structure 362. The woven structure 362 includes a plurality of depressions 364 and a plurality of protrusions 366 corresponding to the plurality of depressions 364. The depressions 364 are open toward a cushion (not shown). The woven structure 362 further includes flexible portions 368 and reinforced portions 370. The flexible portions 368 stretch under a load so that the cushion can extend into the depression 364.

Figure 16:
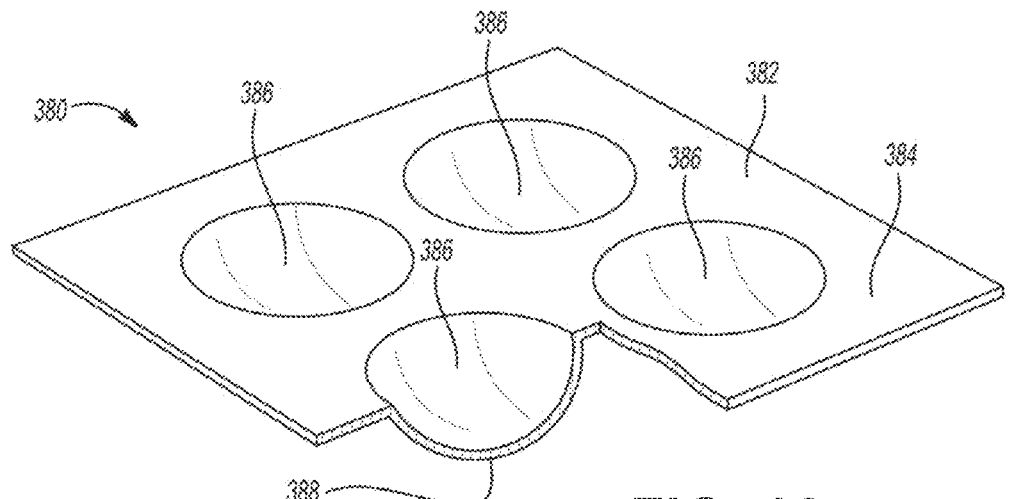
FIG. 16 is a partial perspective view of a portion of a homogeneous suspension according to certain aspects of the present disclosure.

With reference to FIG. 16, a portion 380 (e.g., a second portion) of yet another full suspension according to certain aspects of the present disclosure is provided. The portion 380 includes a homogeneous structure 382. In one example, the homogeneous structure 382 is formed from an elastomer. The homogeneous structure 382 includes a side 384 defining a plurality of depressions 386 and a plurality of protrusions 388 corresponding to the plurality of depressions 386. In one example, the depressions 386 are hemispherical. The depressions 386 open toward a cushion (not shown) so that they can receive respective portions of the cushion.

A full suspension according to certain aspects of the present disclosure includes at least two portions, with at least one portion including a depression. The suspension may include more than two portions. The suspension may further include a variety of features as described above with respect to FIGS. 4-5. The portions may be arranged in a variety of configurations to optimize occupant comfort. FIGS. 17-22 depict examples of halves of suspensions having a variety of configurations. The suspensions of FIGS. 17-22 are described in the context of a lower portion of a seat (see, e.g., the lower portion 12 of the seat assembly 10 of FIG. 1). However, those skilled in the art will appreciate that suspensions according to various aspects of the present disclosure may also be configured for use in a back portion of a seat (see, e.g., the back portion 14 of the seat assembly 10 of FIG. 1).

Figure 17:
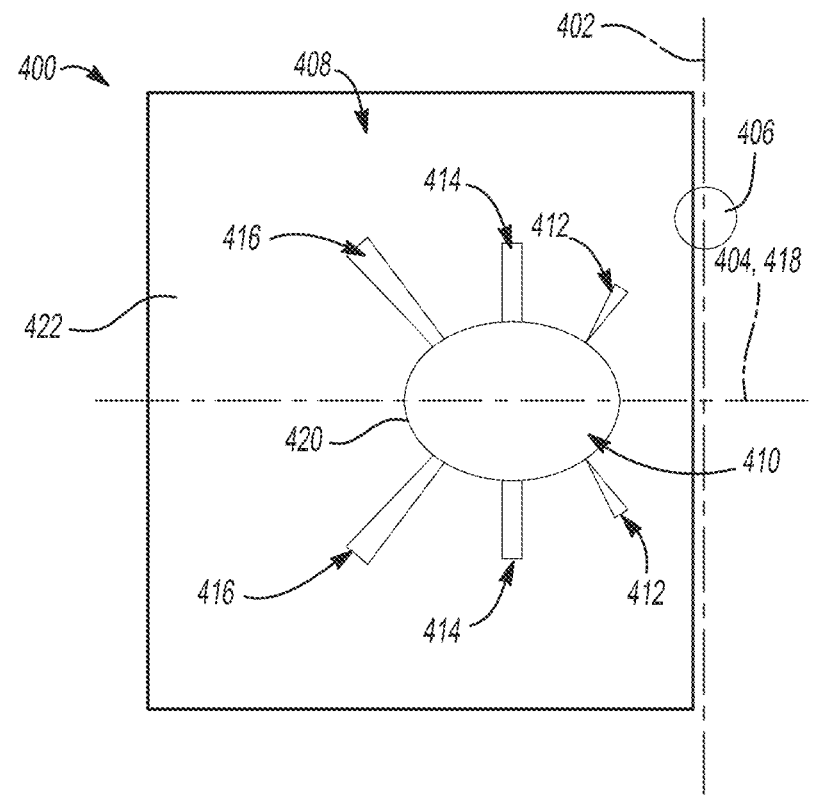
FIG. 17 is a partial schematic view of a full suspension according to certain aspects of the present disclosure.

With reference to FIG. 17, a full suspension 400 according to certain aspects of the present disclosure is provided. The full suspension 400 extends along a longitudinal axis 402 and a transverse axis 404. The longitudinal axis 402 and the transverse axis 404 cooperate to divide the full suspension 400 into quadrants. An H-point 406 indicates a position of a seated occupant. The H-point 406 refers to a mid-point of a line connecting the hip joints of the seated occupant.

The full suspension 400 includes a first portion 408, a second portion 410, two third portions 412, two fourth portions 414, and two fifth portions 416. The second portion 410 defines an oval shape. In various aspects, the oval shape is an ellipse, or optionally a circle. A centerline 418 of the second portion 410 is aligned with the transverse axis 404. The third, fourth, and fifth portions 412, 414, 416 extend outwardly from a perimeter 420 of the second portion 410. The first portion 408 surrounds the second, third, fourth, and fifth portions 410, 412, 414, 416.

The first portion 408 includes a surface or side 422 that can directly contact a cushion (not shown). At least one of the second, third, fourth, and fifth portions 410, 412, 414, 416 includes one or more depressions (see, e.g., depressions 248, 276, 308, 336, 364, 386 of FIGS. 11-16, respectively) that open toward the cushion. In one example, the second portion 410 includes one or more depressions and the third, fourth, and fifth portions 412, 414, 416 define apertures.

Figure 18:
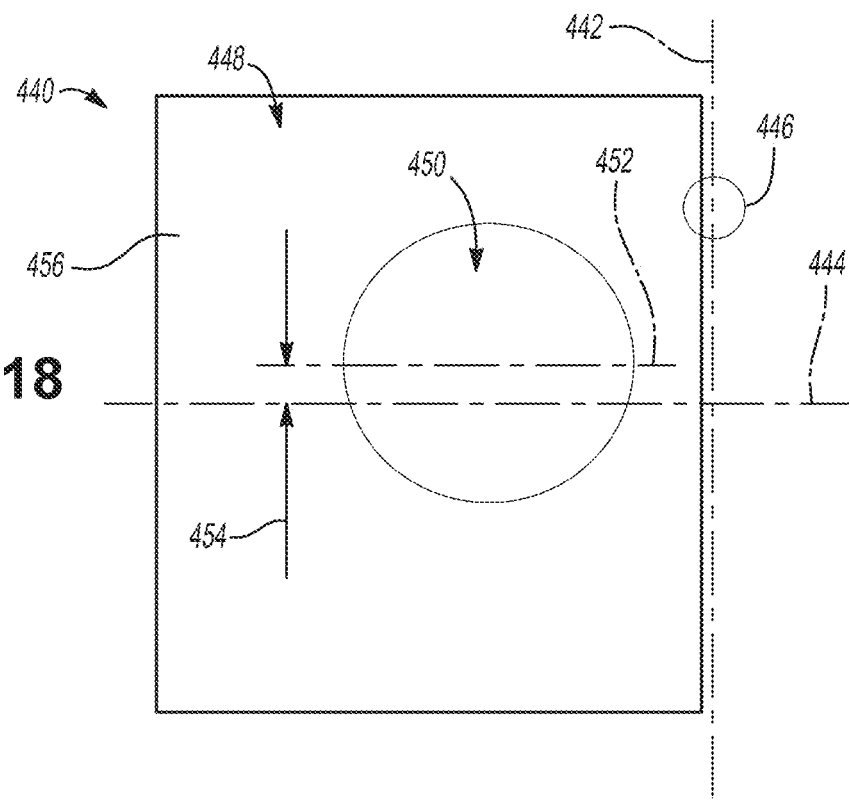
FIG. 18 is a partial schematic view of another full suspension according to certain aspects of the present disclosure.

Referring to FIG. 18, another full suspension 440 according to certain aspects of the present disclosure is provided. An H-point 446 indicates a position of a seated occupant. The full suspension 440 includes a first portion 448 and a second portion 450. The second portion 450 defines an oval shape. In various aspects, the oval shape is an ellipse, or optionally a circle. The first portion 448 surrounds the second portion 450.

The second portion 450 includes a centerline 452 that extends parallel to the transverse axis 444. The centerline 452 is offset from the transverse axis by an amount 454. The centerline 452 is disposed longitudinally between the H-point 446 and the transverse axis 444. Accordingly, the centerline 452 is closer to the H-point 446 than the transverse axis 444 is to the H-point 446.

The first portion 448 includes a surface or side 456 that can directly contact a cushion (not shown). The second portion 410 includes one or more depressions (see, e.g., depressions 248, 276, 308, 336, 364, 386 of FIGS. 11-16, respectively) that are open to the cushion.

Figure 19:
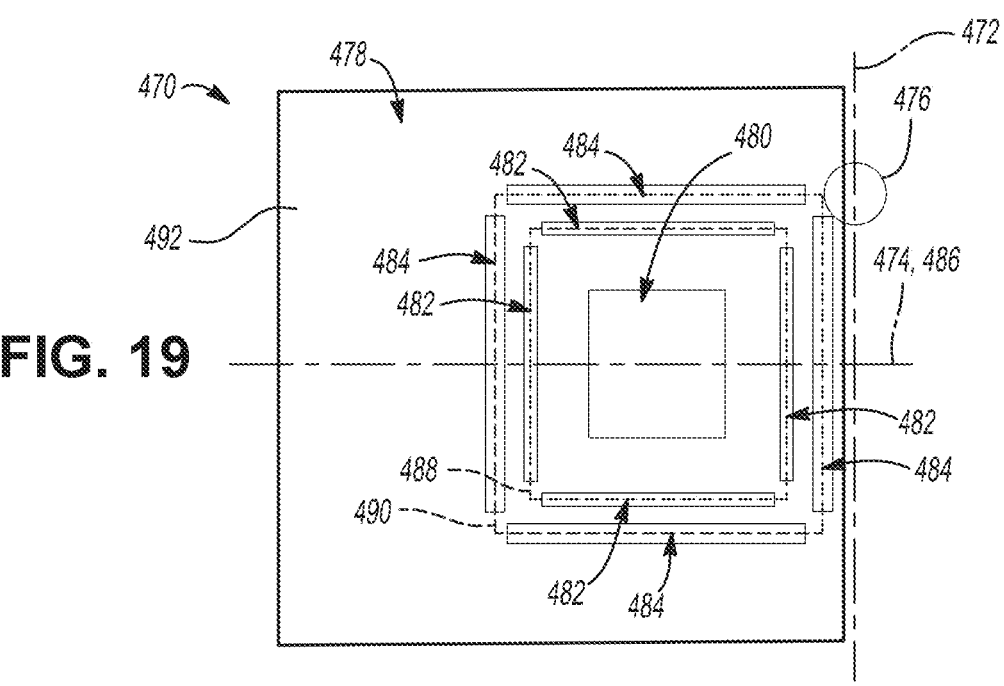
FIG. 19 is a partial schematic view of yet another full suspension according to certain aspects of the present disclosure.

With reference to FIG. 19, yet another full suspension 470 according to certain aspects of the present disclosure is provided. The full suspension 470 extends along a longitudinal axis 472 and a transverse axis 474 that cooperate to divide the full suspension 470 into equal quadrants. An H-point 476 indicates a position of a seated occupant.

The full suspension 470 includes a first portion 478, a second portion 480, a plurality of third portions 482, and a plurality of fourth portions 484. The plurality of third portions 482 includes four third portions 482. The plurality of fourth portions 484 includes four fourth portions 484. The second portion 480 includes a centerline 486 that is aligned with the transverse axis 474.

The second portion 480 defines a rectangular shape. In various aspects, the rectangular shape of the second portion 480 is a square. The third portions 482 and the fourth portions 484 also define rectangular shapes. The third portions 482 are arranged in a first generally rectangular pattern 488. The second portion 480 is disposed inside of the first generally rectangular pattern 488. The fourth portions 484 are arranged in a second generally rectangular pattern 490. The second portion 480 and the third portions 482 are both disposed inside of the second generally rectangular pattern 490. The first portion 478 surrounds the second, third, and fourth portions 480, 482, 484.

The first portion 478 includes a surface or side 492 that can directly contact a cushion (not shown). At least one of the second, third, and fourth portions 480, 482, 484 includes a plurality of depressions (see, e.g., depressions 248, 276, 308, 336, 364, 386 of FIGS. 11-16, respectively) that are open toward the cushion. In one example, the second portion 480 includes a plurality of depressions and the third and fourth portions 482, 484 define apertures.

Figure 20:
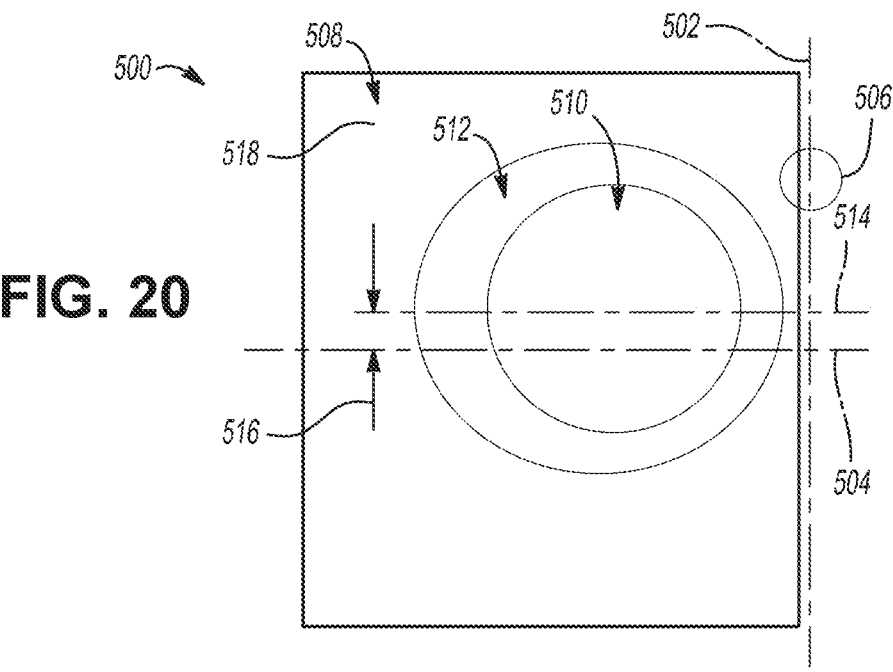
FIG. 20 is a partial schematic view of yet another full suspension according to certain aspects of the present disclosure.

Referring to FIG. 20, yet another full suspension 500 according to certain aspects of the present disclosure is provided. The full suspension 500 extends along a longitudinal axis 502 and a transverse axis 504 that cooperate to divide the full suspension 500 into four equal quadrants. An H-point 506 indicates a position of a seated occupant.

The full suspension 500 includes a first portion 508, a second portion 510, and a third portion 512. The second and third portions 510, 512 each define oval shapes. In various aspects, the oval shapes are ellipses, or optionally circles. The third portion 512 surrounds the second portion 510. The first portion 508 surrounds the third portion 512. The second and third portions 510, 512 have centers that are aligned.

The second and third portions 510, 512 include a common centerline 514. The common centerline 514 is disposed longitudinally between the transverse axis 504 and the H-point 506. Accordingly, the common centerline 514 is disposed closer to the H-point 506 than the transverse axis 504 is disposed to the H-point 506. The common centerline 514 is spaced apart from the transverse axis 504 by an amount 516.

The first portion 508 includes a surface or side 518 that can directly contact a cushion (not shown). At least one of the second portion 510 and the third portion 512 includes a plurality of depressions (see, e.g., depressions 248, 276, 308, 336, 364, 386 of FIGS. 11-16, respectively) that open toward the cushion. In one example, the second portion 510 includes one or more first depressions and the third portion 512 includes one or more second depressions (not shown). The first depressions are deeper than the second depressions. Therefore, when the full suspension 500 is not under occupant load (i.e., the occupant is not seated), a first gap between a surface of the second portion 510 is larger than a second gap between a surface of the third portion 512.

Figure 21:
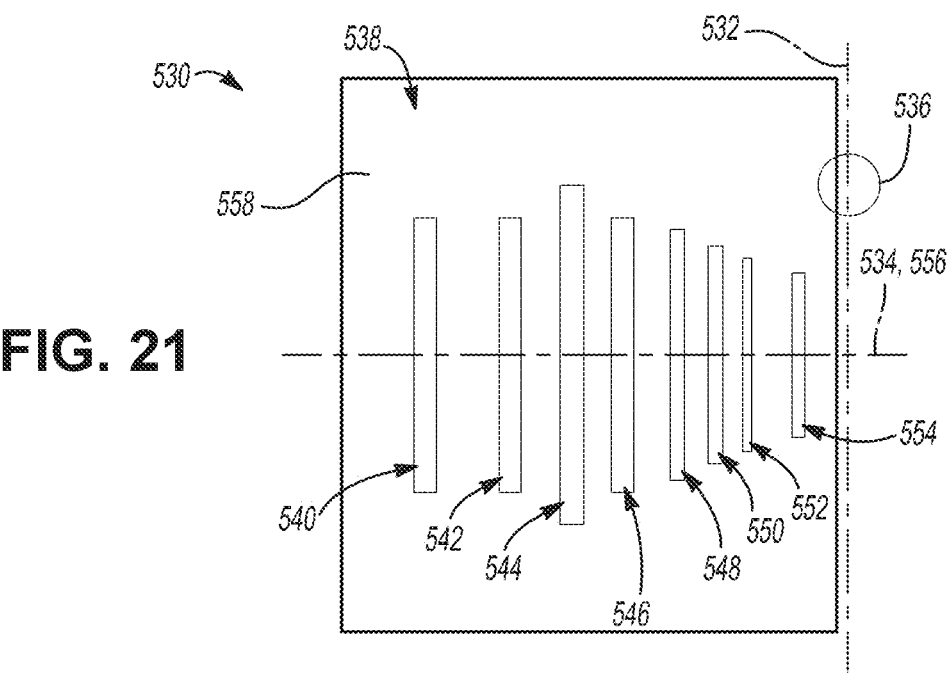
FIG. 21 is a partial schematic view of yet another full suspension according to certain aspects of the present disclosure; and In the drawings, reference numbers may be reused to identify similar and/or identical elements.

With reference to FIG. 21, yet another full suspension 530 according to certain aspects of the present disclosure is provided. The full suspension 530 extends along a longitudinal axis 532 and a transverse axis 534 that cooperate to divide the full suspension 530 into equal quadrants. An H-point 536 indicates a position of a seated occupant.

The full suspension 530 includes a first portion 538, a second portion 540, a third portion 542, a fourth portion 544, a fifth portion 546, a sixth portion 548, a seventh portion 550, an eighth portion 552, and a ninth portion 554. The second, third, fourth, fifth, sixth, seventh, eighth, and ninth portions 540, 542, 544, 546, 548, 550, 552, 554 include a common centerline 556 that is aligned with the transverse axis 534. Each of the second, third, fourth, fifth, sixth, seventh, eighth, and ninth portions 540, 542, 544, 546, 548, 550, 552, 554 defines a rectangular shape that is surrounded by the first portion 538.

The first portion 538 includes a surface or side 558 that is in direct contact with a cushion (not shown). At least one of the second, third, fourth, fifth, sixth, seventh, eighth, and ninth portions 540, 542, 544, 546, 548, 550, 552, 554 includes one or more depressions (see, e.g., depressions 248, 276, 308, 336, 364, 386 of FIGS. 11-16, respectively) that open toward the cushion. In one example, each of the second, third, fourth, fifth, sixth, seventh, eighth, and ninth portions 540, 542, 544, 546, 548, 550, 552, 554 includes a plurality of depressions. In another example, some of the second, third, fourth, fifth, sixth, seventh, eighth, and ninth portions 540, 542, 544, 546, 548, 550, 552, 554 define apertures.

Although the suspensions and seat assemblies according to certain aspects of the present disclosure are described in the context of automotive seats, those skilled in the art would appreciate that the suspensions and seat assemblies may also be used in other vehicles or non-vehicle seating applications. For example, the suspensions and seat assemblies may be used in trains, airplanes, helicopters, boats, agricultural equipment, public transportation, recreational vehicles, and military vehicles. The suspensions and seat assemblies may also be used in airports, classrooms, waiting rooms, offices, entertainment venues, restaurants, and home furnishings, by way of example.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

What is claimed is:

1. A seat assembly for supporting an occupant of a vehicle, the seat assembly comprising:
    a cushion having a first surface and a second surface, the first surface being configured to engage the occupant, and the second surface being disposed opposite the first surface; and
    a suspension including a first portion and a second portion, the first portion including a third surface engaging the second surface of the cushion, and the second portion including a fourth surface defining a plurality of depressions, the plurality of depressions opening toward the cushion and being configured to receive a portion of the cushion when the occupant exerts a load on the cushion.

2. The seat assembly of claim 1 wherein the first portion includes a textile material.

3. The seat assembly of claim 2, wherein the textile material includes at least one of a knitted structure, a woven structure, a crocheted structure, or a braided structure.

4. The seat assembly of claim 2 wherein:
    the first portion includes a first knitted structure; and
    the second portion includes a second knitted structure, the second knitted structure being different than the first knitted structure.

5. The seat assembly of claim 1 wherein the second portion includes a textile material.

6. The seat assembly of claim 5, wherein the textile material includes at least one of a knitted structure, a woven structure, a crocheted structure, or a braided structure.

7. The seat assembly of claim 6, wherein:
    the textile material includes the knitted structure; and
    the knitted structure is a three-dimensional (3D) knitted structure.

8. The seat assembly of claim 6 wherein:
    the second portion includes the knitted structure; and
    the knitted structure includes a plurality of ribs.

9. The seat assembly of claim 1 wherein the second portion includes an elastomer.

10. The seat assembly of claim 9 wherein the first portion includes the elastomer.

11. The seat assembly of claim 1 wherein:
    the first portion is configured to provide a first response to the load; and the second portion is configured to provide a second response to the load, the second response being different than the first response.

12. The seat assembly of claim 11 wherein:
the first response includes at least one of a stiffness response, an energy dissipation response, and a thermal response; and
the second response includes at least one of a stiffness response, an energy dissipation response, and a thermal response.

13. The seat assembly of claim 1, wherein the plurality of depressions includes a primary depression and a secondary depression, the secondary depression being further recessed with respect to the cushion than the primary depression.

14. A seat assembly for supporting an occupant of a vehicle, the seat assembly comprising:
a cushion having a first surface and a second surface, the first surface being configured to engage the occupant, and the second surface being disposed opposite the first surface; and
a suspension including a first portion and a second portion, the first portion including a third surface engaging the second surface of the cushion, and the second portion including a fourth surface, at least a portion of the fourth surface being spaced apart from the second surface of the cushion to define a gap, wherein at least one of the first portion or the second portion includes a textile.

15. The seat assembly of claim 14 wherein the suspension further includes a third portion including a fifth surface defining a second depression, the second depression being open toward the cushion and configured to receive a portion of the cushion when the occupant exerts a load on the cushion.

16. The seat assembly of claim 14 wherein:
the first portion includes a first textile having at least one of a first knitted structure, a first woven structure, a first crocheted structure, and a first braided structure; and
the second portion includes a second textile having at least one of a second knitted structure, a second woven structure, a second crocheted structure, and a second braided structure.

17. The seat assembly of claim 16 wherein:
the second textile includes the second knitted structure; and
the second knitted structure is a three-dimensional (3D) knitted structure.

18. The seat assembly of claim 14 wherein:
the first portion is configured to provide a first response to the occupant exerting a load on the cushion; and
the second portion is configured to provide a second response to the load, the second response being different than the first response.

19. A seat assembly for supporting an occupant of a vehicle, the seat assembly comprising:
a cushion having a first surface and a second surface, the first surface being configured to engage the occupant, and the second surface being disposed opposite the first surface; and
a suspension including a first knitted portion and a second knitted portion, the first knitted portion including a third surface engaging the second surface of the cushion, and the second knitted portion having a three-dimensional (3D) knitted structure and including a fourth surface defining a depression, the depression being open toward the cushion and configured to receive a portion of the cushion when the occupant exerts a load on the cushion, wherein:
the first knitted portion is configured to provide a first response to the occupant exerting a load on the cushion; and
the second knitted portion is configured to provide a second response to the load, the second response being different than the first response.

* * * * *